Figures 1, 2:
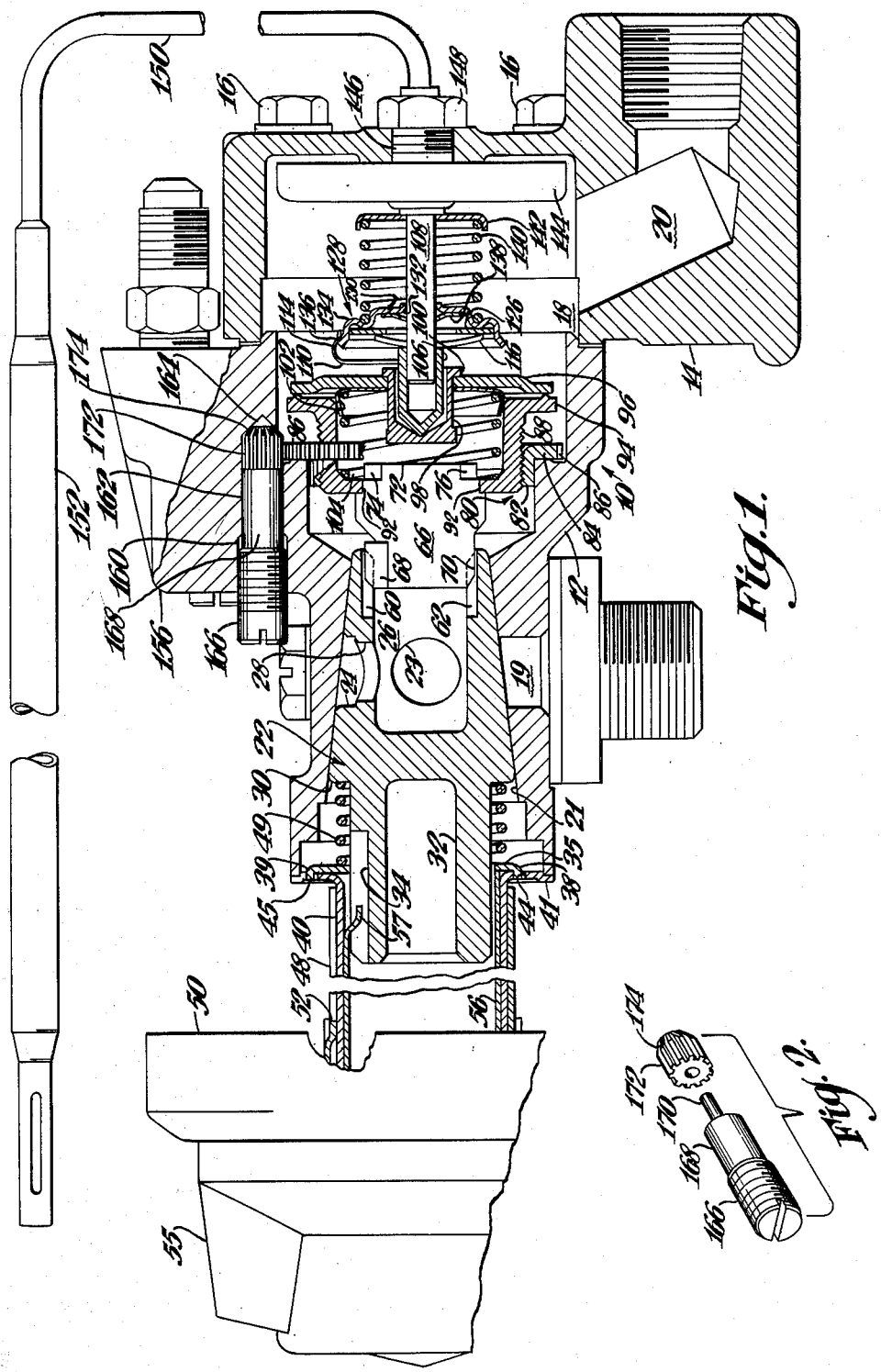

United States Patent Office 2,991,013
Patented July 4, 1961

2,991,013
THERMOSTATIC VALVE CONTROL
Clarence Wantz, Greensburg, Pa., assignor to Robertshaw-Fulton Controls Company, Richmond, Va., a corporation of Delaware
Filed May 20, 1958, Ser. No. 736,538
6 Claims. (Cl. 236—99)

This invention relates to flow control devices and more particularly to a combined gas cock and valve for controlling and regulating thermostatically a flow of gaseous fuel to a burner.

An object of this invention is to calibrate a thermostatic control device by means of its temperature setting mechanism.

Another object of this invention is to utilize the actuating means of a thermostatic control device for a temperature setting operation and a calibrating operation.

Another object of this invention is to furnish a thermostatic control device with a calibration lock that is releasable for a calibrating operation.

This invention has a further object in that the valve means of a thermostatic control device is subject to rotational and axial movement for a temperature setting operation and to only rotational movement for a calibrating operation.

This invention is particularly applicable to the combination of a rotary shut-off cock and a reciprocating disc valve which is operable automatically by thermal-responsive means to maintain a predetermined temperature in an appliance such as the oven of a gas range. In the preferred construction, a valve seat assembly includes a first member which is movable axially relative to a regulating valve member and a second member in threaded engagement with the first member. Calibration locking means in the form of a screw extends through the front of the control housing and rotatably supports a pinion on its inner end for engagement with gear teeth provided on the periphery of the second member of the valve seat assembly. When the screw is tightened, the pinion is frictionally locked in its recess and prevents rotation of the second member of the valve seat assembly. When the screw is loosened, the pinion is free to rotate so that the first and second members of the valve seat assembly rotate as a unit.

Other objects and advantages will become apparent from the following description taken in connection with the accompanying drawings wherein:

FIG. 1 is a side elevation view, partly in section, of a thermostatic valve control embodying this invention; and
FIG. 2 is an exploded perspective view of a detail of FIG. 1.

As is illustrated in FIG. 1, the thermostatic control device includes a housing, indicated generally at 10, having a front casing 12 and a rear casing 14 secured together by suitable bolts 16. The interior of housing 10 is hollowed out to form a valve chamber 18 which establishes communication between an inlet port 19 in the front casing 12 and an outlet port 20 in the rear casing 14. The front casing 12 is open at one end and provided with a frusto-conical bore forming a tapered valve seat 21 which intersects the inlet port 19 and communicates with the valve chamber 18. A generally hollow shut-off cock or valve member 22 has a corresponding tapered surface for cooperation with the tapered valve seat 21.

A pair of oppositely disposed ports 23 (only one being shown) in the hollow valve member 22 are connected by an arcuate groove 24 to permit a flow of gas from inlet 19 to an internal bore 26 of the valve member 22. A small aperture 28 is provided in the side wall of the valve member 22 defined by the groove 24 midway between the ports 23 to facilitate the flow of gas in certain positions of the valve member 22.

Oppositely disposed to the hollow bore 26, the shut-off cock 22 is reduced on its outer periphery to form an annular flange 30 and a cylindrical stem 32 extending through the opening in housing 10. The outer portion of stem 32 is provided with three longitudinally extending slots 34 (only one being shown) radially spaced 90° from each other about the periphery of the valve stem 32. A ring-type washer 35 is mounted on stem 32 and is provided with a pair of oppositely disposed tabs (not shown) on its inner periphery which are received in the correspondingly disposed slots in the stem 32 for unitary rotation of the washer 35 and the valve stem 32. Ring washer 35 is also provided with another pair of perpendicularly bent lugs 38 and 39 located on its outer periphery and angularly displaced 90° from the inner peripheral tabs; the first lug 38 lies just inside the peripheral edge of ring washer 35 and the second lug 39 lies just outside of such peripheral edge.

A generally cylindrical cover 40 is open at both ends and an annular flange 41 on one end thereof is provided with mounting means (not shown) for securing the same to the front end of housing 10 by suitable fastening means as is well known in the art. An arcuate portion of the annular flange 41 is bent perpendicularly for abutment by lug 39 to define the limits of rotation of the ring member 35 and the gas cock 32. The annular flange 41 is also provided with a pair of oppositely disposed rectangular openings 44 and 45 which respectively receive the lugs 38 and 39 of the ring washer 35. The cylindrical portion of cover 40 has a bent out section engaging a similar opening in a split collar 48 for correctly positioning the collar 48 on the cover 40. A coil spring 49 surrounds the inner portion of stem 32 and is mounted in compression between the annular shoulder 30 of the gas cock 22 and the ring washer 35 whereby the lugs 38 and 39 are biased into the cover slots 44 and 45, respectively, to lock the gas cock 22 in its "off" position.

When the cover 40 is securely fastened to the housing 10, the coil spring 49, ring washer 35, and cover 40 are held in assembled relationship with the inner peripheral tabs on the ring washer 35 extending inwardly of the cylindrical portion of cover 40. The split collar 48 is mounted on the exterior of the cylindrical portion of cover 40 and provides an aligning and mounting means for a generally annular bezel 50. A centrally apertured mounting portion of bezel 50 is provided with an inwardly bent aligning lug 52 which is received in the space forming the split collar 48.

A control knob dial 55, having suitable temperature setting indicia which cooperate with a fixed index on the bezel 50, is secured to the cylindrical operating sleeve 56 which is slidably and rotatably mounted within the cylindrical portion of cover 40. Slightly spaced from its inner end, the dial 55 is provided with a longitudinally extending inwardly bent tang 57 which is received in slot 34 in the stem 32. The dial sleeve 56 is also provided with interlocking tabs (not shown) which cooperate with the inner peripheral tabs on the ring washer 35 to assure proper assembled relationship of the sleeve 56 with the gas cock 22.

Adjacent its inner end, the gas cock 22 is provided with large and small slots, 60 and 62, oppositely disposed on its inner periphery which define the wall of hollow bore 26. A driving element 66 in the form of a flat rectangular plate has a reduced rear portion having large and small edges, 68 and 70, which are slidably mounted in the slots 60 and 62, respectively. The front end of drive plate 66 is provided with a reduced portion with oppositely bent locking flanges 74 and 76 on its opposite edges.

A valve seat assembly, indicated generally at 80, is mounted in the valve chamber 18 and comprises a pair of relatively movable members. The first member is an internally threaded annular bushing 82 having an annular flange 84 with gear teeth 86 on its peripheral edge. The annular bushing 82 is sealingly mounted on an internal shoulder formed in the front casing wall which defines a part of the valve chamber 18; the bushing 82 can rotate on such internal shoulder but does not move axially. The second member is an externally threaded valve seat 88 which is threadedly mounted in the bushing 82. The valve seat 88 has a generally cup-shaped configuration with a central aperture in its bottom wall which is formed with a pair of oppositely disposed slots 92 which holds the front end of drive member 66 therein by means of the bent flanges 74 and 76. On the end opposite its bottom wall, the valve seat 88 is provided with an outwardly extending radial flange 94, the front of which serves as an annular valve seating surface.

A reciprocating disc-shaped valve member 96 is centrally apertured to be slidably mounted on a cup-shaped hub 98 which is outwardly flanged adjacent its open end to form an annular retainer 100 for the valve member 96. A spring retainer 102 is slidably mounted on the hub 98 contiguous to the side of valve member 96 which cooperates with the seating surface of the valve seat 88. A load spring 104 encircles the hub 98 and is mounted in compression between the bottom wall of the valve seat 88 and the retainer 102 so that the valve member 96 is always biased against the hub flange 100. A cup-shaped sleeve 106 is slidably received within the hub 98 and has its nose portion abutting the bottom wall of hub 98. The open end of cup-shaped sleeve 106 is adapted to receive the end of a power element shaft 108 as is illustrated in FIG. 1. A spring clip 110 is resiliently mounted on sleeve 106 by means of a looped portion on one end and is provided with a projecting tongue 114 on its opposite end.

A bimetallic disc 116 has a central mounting aperture for mounting the same on shaft 108 with its central portion abutting the edge defining the open end of sleeve 106. A ring washer 126, having a relatively large central aperture, is mounted on shaft 108 and is free from engagement therewith. The contacting surfaces of the disc 116 engage the washer 126 to hold the latter in abutting relation with a generally dish-shaped guide member, indicated generally at 128. The guide 128 has a centrally apertured bottom wall, the inner periphery of which forms an annular shaft bearing 132. The outer periphery of the bottom wall 130 is integrally formed with an inverted annulus 134 having a generally S-shaped cross-section. The outer periphery of annulus 134 projects in a direction opposite to that of bearing 132 and is formed with an outwardly extending annular flange 136 with which the tongue 114 engages to retain the sleeve 106 in assembled relationship on the shaft 108.

A locking piece in the form of a lockwasher 138 has a plurality of inwardly projecting teeth and toward the free end of the shaft 108 so that when assembled thereon the lockwasher 138 is slidable from the left to the right on the shaft 108 as viewed in FIG. 1, but is prevented from moving from the right to the left on shaft 108. The outer ring portion of the lockwasher 138 fits within the inverted annulus 134 of guide 128 so that one of its sides is engageable with the bottom wall of the guide 128 and its opposite side is engageable with part of the ring portion of washer 126.

The two washers 126 and 138 engage one side of the guide 128 and an overtravel coil spring 140 engages the opposite side. The coil spring 140 encircles the shaft 108 and is mounted in compression between the guide 128 and a retainer 142 which is secured to shaft 108 for movement therewith. The attaching end of shaft 108 is integrated with an expansion power element 144 which may be of any suitable type that is well known in the art. The power element 144 is mounted on the rear of casing 14 by means of a threaded stud 146 and a locknut 148. The stud 146 is provided with a central bore (not shown), one end of which communicates with the power element 144 and its other end receives the end of a capillary tube 150, which in turn is connected to a temperature sensing bulb 152 suitably positioned in a space to be temperature controlled.

The power element 144, the stud 146, the capillary tube 150, and the sensing bulb 152 constitute a closed system filled with an expansible fluid so that a variation of temperature sensed by the bulb 152 produces a corresponding expansion or contraction of the power element 144. A corresponding movement of the power element shaft 108 is effective to produce reciprocation of the valve member 96.

A thickened portion 156 formed on the top of front casing 12 is provided with a bore 160 having a reduced inner portion 162. A side wall of the inner bore 162 is cut out to establish communication with the valve chamber 18. The inner bore 162 has a bottom wall 164 tapered to form a conical surface. A locking screw 166 is threaded into bore 160 and has a reduced portion 168 fitting into the inner bore 162. A still further reduced portion or shaft 170 extends from the inner end of the reduced portion 168 and has a pinion 172 rotatably mounted thereon. One end face of the pinion 172 is provided with a conical surface 174 having the same taper as the conical bottom wall 164 of the inner bore 162. The pinion 172 is slightly longer than the shaft 170 so that when the screw 166 is loosened, the pinion 172 will freely rotate on the shaft 170. The pinion 172 meshes with the gear teeth 86 on the annular bushing 84 so that when the screw 166 is tightened, the conical surface 174 of the pinion 172 is jammed into engagement with the conical surface 164 so that the pinion 172 and the annular bushing 82 are both prevented from rotating.

In order to place the thermostatic control device in operation, the dial 55 is depressed inwardly against the bias of coil spring 49 and rotated counterclockwise to a desired temperature setting. Rotation of the dial 55 to a desired temperature setting causes rotation of the gas cock 22 and the drive plate 66 which in turn rotates the threaded valve seat 88 relative to the threaded bushing 82. Because of this threaded connection and because the bushing 82 is held against rotation by the locking means comprising the pinion 172 and the screw 166, the rotary motion of the drive plate 66 is converted to axial movement for the valve seat 88. Thus, dial 55, dial sleeve 56, gas cock 22, and drive plate 66 rotate as a unit to constitute the actuating means for selectively positioning the valve seating surface 94 relative to the valve member 96.

As the temperature of the space being controlled approaches that for which the dial 55 has been set, the thermally responsive means moves the valve member 96 toward the valve seating surface 94. In order to maintain the temperature of the space at a predetermined setting, the thermally responsive means effects reciprocation of the valve member 96 in a manner that is well known in the art.

When it is desired to calibrate the control device, the dial 55 is rotated to a mid-point setting and a thermometer is placed in the oven in which the sensing bulb 152 is disposed. After the oven has reached a constant temperature, the locking screw 166 is loosened and the dial 55 is rotated to a temperature setting corresponding to that indicated by the thermometer in the oven. During such rotation of dial 55, the valve actuating means rotates the valve seat 88 and the bushing 82 because the rotative friction between the bushing 82 and the valve seat 88 is by design greater than the rotative friction between the bushing 84 and its mounting shoulder in the chamber 18. Thus, whenever the locking screw 166 is loosened, the bushing 82 will rotate as a unit with the valve seat 88 so that no axial movement is imparted to the valve seat 88.

During this unitary rotation, the pinion 172 also freely rotates on the shaft 170 in response to the movement of the gear teeth 86 on the annular bushing 82. After the dial 55 is moved to a temperature setting which corresponds with the thermometer indication, the locking screw 166 is tightened to jam the pinion 172 in its conical recess and thus prevent the rotation of the pinion 172 and the annular bushing 82.

Inasmuch as the above description of the drawing is subject to various modifications and changes, it is intended that the foregoing description and drawing be interpreted as illustrative and not in a limiting sense.

I claim:

1. In a thermostatic control device, the combination comprising a housing having an inlet and an outlet, movable valve seat means including a bushing having peripheral gear teeth disposed in said housing between the inlet and the outlet, a movable valve member cooperating with said valve seat means to regulate a flow of fluid to the outlet, thermally responsive means operatively connected to said valve member to reciprocate the same in response to temperature variations, actuating means operatively connected to said valve seat means for moving the same axially relative to said valve member, friction means comprising a pinion disposed in said housing and meshing with the gear teeth on said bushing to lock said valve seat means in an adjusted position, and releasing means comprising a screw threadedly extending through said housing and having a shaft on its inner end for carrying said pinion and being operable to permit said pinion to rotate on said shaft whereby said valve seat means is released from its locked adjusted position.

2. In a thermostatic control device, the combination comprising a housing having an inlet and an outlet with a valve chamber therebetween, a control valve member operably disposed in the chamber adjacent the inlet for controlling a flow of fluid from the inlet to the chamber, means internally formed in said housing and defining a mounting shoulder in the chamber, an internally threaded annular bushing mounted on said shoulder for rotational movement thereon, an externally threaded valve seat member threaded into said bushing and being operatively connected to said control valve member, said valve seat member and said bushing having a greater rotative friction therebetween than between said bushing and said mounting shoulder whereby said bushing and said valve seat member are rotatable as a unit, dial means connected to said control valve member for moving the same between controlling positions and causing movement of said valve seat member, a regulating valve member movably disposed in the chamber and cooperating with said valve seat means to regulate the flow of fluid to the outlet, a recess formed in said housing, friction means operably disposed in said recess and cooperating with said annular bushing, and a locking screw threaded into said recess and jamming said friction means in said recess to lock said friction and said annular bushing against rotation whereby movement of said control valve member by said dial means causes said valve seat member to move axially relative to said annular bushing, said locking screw being operable to release said friction means from its jammed position whereby said friction means and said annular bushing and said valve seat member are rotated simultaneously with said control valve member and said dial means.

3. In a thermostatic control device, the combination comprising a housing having an inlet and an outlet, control valve means operably disposed in said housing adjacent the inlet for controlling a flow of fluid therefrom, dial means disposed on an external wall of said housing and operable for moving said control valve means between controlling positions, a regulating valve member operably disposed in said housing for regulating the flow of fluid to the outlet, thermally responsive means operative for imparting regulatory movement to said regulating valve member in response to temperature variations, valve seat means for said regulating valve member including a bushing having peripheral gear teeth and being operatively connected to said control valve means for simultaneous movement therewith by said dial means, friction means including a pinion meshing with the gear teeth on said bushing and locking said valve seat means whereby movement of said dial means causes movement of said control valve means and said valve seat means to a predetermined setting relative to said regulating valve member, and means extending through the same wall of said housing as said dial means in spaced relation thereto for releasing said friction means whereby movement of said dial means causes simultaneous movement of said control valve means and said valve seat means for adjusting said valve seat means without disturbing the predetermined setting relative to said regulating valve member, said releasing means including a screw having a shaft on its inner end for carrying said pinion.

4. In a thermostatic control device, the combination comprising a housing having an inlet and an outlet, a valve chamber in said housing disposed between the inlet and outlet, a movable valve seat assembly including a first member mounted for rotation in said chamber and a second member mounted for rotational and axial movement in said first member, a valve member cooperating with said valve seat assembly to regulate a flow of fluid to the outlet, thermally responsive means operative for imparting regulatory movement to said valve member in response to temperature variations, actuating means operative for rotating said second member, and means disposed in spaced parallel relation to said actuating means so as to be independently operable therefrom and being operative for locking said first member against rotation whereby said actuating means rotates said second member relative to said first member for a temperature setting operation, said locking means being releasable to permit unitary rotation of said first member with said second member by said actuating means.

5. In a thermostatic control device, the combination comprising a housing having an inlet and an outlet, control valve means operably disposed in said housing adjacent the inlet for controlling a flow of fluid therefrom, dial means disposed on an external wall of said housing and operable for moving said control valve between controlling positions, a regulating valve member operably disposed in said housing for regulating the flow of fluid to the outlet, thermally responsive means operative for imparting regulatory movement to said regulating valve member in response to temperature variations, regulating valve seat means disposed in axial alignment with said control valve means and said dial means and being operatively connected to said control valve means for simultaneous movement therewith by said dial means, friction means disposed in spaced parallel relation to said control valve means and locking said valve seat means whereby movement of said dial means causes movement of said control valve means and said valve seat means to a predetermined setting relative to said regulating valve member, and means extending through the same wall of said housing as said dial means in spaced parallel relation thereto and connected to said friction means for releasing said friction means whereby movement of said dial means causes simultaneous movement of said control valve means and said valve seat means for adjusting said valve seat means without disturbing the predetermined setting relative to said regulating valve member.

6. In a thermostatic control device, the combination comprising a housing having an inlet and an outlet, movable valve seat means disposed in said housing between the inlet and the outlet and including a connectible portion and an engageable portion, a movable valve member cooperating with said valve seat means to regulate a flow of fluid to the outlet, thermally responsive means operative to move said valve member in response to temperature variations, means defining a first opening in said housing, actuating means operatively disposed in said opening and being connected to said connectible portion for moving said valve seat means axially relative to said valve member, means defining a second opening in said housing spaced from said first opening so as to be separately accessible therefrom, friction means operably disposed in said second opening and operatively engaging said engageable portion for locking said valve seat means in an adjusted position, and means extending into said second opening for cooperation with said friction means and being operable to disengage said friction means from said engageable portion whereby said valve seat means is released from its locked adjusted position.

References Cited in the file of this patent

UNITED STATES PATENTS

| | | |
|---|---|---|
| 968,358 | Jacobson | Aug. 23, 1910 |
| 1,058,171 | Froehlich | Apr. 8, 1913 |
| 1,971,801 | Wantz | Aug. 28, 1934 |
| 2,066,821 | Brumbaugh | Jan. 5, 1937 |
| 2,141,614 | Mott | Dec. 27, 1938 |
| 2,190,276 | Smith | Feb. 13, 1940 |
| 2,807,423 | Eskin | Sept. 24, 1957 |

FOREIGN PATENTS

| | | |
|---|---|---|
| 432,909 | Great Britain | Aug. 6, 1935 |